United States Patent
Tomic et al.

(10) Patent No.: US 9,309,406 B2
(45) Date of Patent: Apr. 12, 2016

(54) FUEL PART AND PROCESS FOR PRODUCING OF A FUEL PART

(75) Inventors: Katarina Tomic, Echt (NL); Konraad Dullaert, Echt (NL); Eric Willem Van Der Vegte, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 13/812,195

(22) PCT Filed: Jul. 21, 2011

(86) PCT No.: PCT/EP2011/062547
§ 371 (c)(1),
(2), (4) Date: Jun. 6, 2013

(87) PCT Pub. No.: WO2012/013570
PCT Pub. Date: Feb. 2, 2012

(65) Prior Publication Data
US 2013/0261245 A1 Oct. 3, 2013

(30) Foreign Application Priority Data

Jul. 26, 2010 (EP) .................................. 10170790

(51) Int. Cl.
*B60K 15/00* (2006.01)
*C08L 77/02* (2006.01)
*C08L 77/06* (2006.01)
*B60K 15/03* (2006.01)

(52) U.S. Cl.
CPC ........... *C08L 77/02* (2013.01); *B60K 15/03177* (2013.01); *C08L 77/06* (2013.01); *B60K 2015/03493* (2013.01); *C08L 2205/02* (2013.01)

(58) Field of Classification Search
CPC ..... C08L 77/02; C08L 77/06; C08L 2205/02; B60K 15/03177; B60K 2015/03493
USPC .................................. 524/451, 726; 123/1 R
See application file for complete search history.

(56) References Cited

U.S. PATENT DOCUMENTS

| 8,263,697 B2 * | 9/2012 | Miyoshi et al. ............... 524/494 |
| 8,357,450 B2 * | 1/2013 | Miyoshi et al. ............... 428/220 |
| 2010/0324195 A1 | 12/2010 | Williamson |

FOREIGN PATENT DOCUMENTS

| CN | 101309971 | 11/2008 |
| EP | 1 241 229 | 9/2002 |
| EP | 1 767 578 | 3/2007 |
| EP | 1 950 248 | 7/2008 |
| EP | 2 028 230 | 2/2009 |
| EP | 2 154 203 | 2/2010 |
| JP | 2010-512422 | 4/2010 |
| JP | 2011-26417 | 2/2011 |
| WO | WO 2007058169 A1 * | 5/2007 |
| WO | WO 2008149862 A1 * | 12/2008 |
| WO | WO 2009/119759 | 10/2009 |

OTHER PUBLICATIONS

Chenar et al, "The effect of water vapor on the performance of commercial polyphenylene oxide and Cardo-type polyimide hollow fiber membranes in CO2/CH4 separation applications", Journal of Membrane Science, 285 (2006) 265-271.
PPO™ Resin 646, Americas: Commercial, Saudi Basic Industries Corporation (SABIC) 2015.
Poly(*p*-phenylene oxide), Wikipedia https://en.wikipedia.org/wiki/Poly(p-phenylene_oxide) (Mar. 8, 2015).

* cited by examiner

*Primary Examiner* — Kelechi Egwim
(74) *Attorney, Agent, or Firm* — Nixon & Vanderhye P.C.

(57) ABSTRACT

This invention relates to a fuel part, comprising a polymer composition comprising: i. a polyamide A in which the ratio of terminal carboxy group concentration over terminal amino group concentration of the polyamide A is equal to 1 or higher, and ii. micro talcum in an amount of 0.001 to 1 weight percent with respect to the total amount of the polymer composition, and iii. an impact modifier in an amount of at least 1.0 weight percent with respect to the total amount of the polymer composition. This invention also relates to a process for producing a fuel part.

8 Claims, No Drawings

FUEL PART AND PROCESS FOR PRODUCING OF A FUEL PART

This application is the U.S. national phase of International Application No. PCT/EP2011/062547, filed 21 Jul. 2011, which designated the U.S. and claims priority to EP Application No. 10170790.9, filed 26 Jul. 2010, the entire contents of each of which are hereby incorporated by reference.

This invention relates to a fuel part comprising a polymer composition and a process for producing such fuel part.

PRIOR ART

Fuel parts are known and for example made from a polymer composition. WO2009/119759 describes a fuel part in which a polyamide resin composition is used consisting of 85 wt % or more of a aliphatic polyamide, wherein the terminal amino group concentration is higher than the terminal carboxy group concentration, and 0.001 to 10 wt % of talcum and 0.0001 to 1 wt % dispersant, that have been dispersed in the aliphatic polyamide. Fuel parts according to WO2009/119759 have good fuel permeation resistance of the welded parts of such fuel tanks.

For safety and environment protection, there has conventionally been a demand for reducing the amount of fuel permeating through a fuel part. Fuel parts according to WO2009/119759 have the drawback that the fuel permeability of the polymer composition is still high and that mechanical properties are insufficient.

OBJECT OF PRESENT INVENTION

It is an object of the present invention to provide fuel parts in which the fuel permeation of the polymer composition in the fuel part is further reduced and in which the mechanical properties remain sufficient.

PRESENT INVENTION

It now has surprisingly been found that a fuel part, comprising a polymer composition comprising:
i. a polyamide A in which the ratio of terminal carboxy group concentration over terminal amino group concentration of the polyamide A is equal to 1 or higher, and
ii. micro talcum in an amount of 0.001 to 1 weight percent with respect to the total amount of the polymer composition, and
iii. an impact modifier in an amount of at least 1 weight percent with respect to the total amount of the polymer composition, shows decreased fuel permeability while shows decreased fuel permeability while maintaining mechanical properties, such as cold impact strength at −30° C.

This has been exemplified in examples that are listed below.

The term "fuel" is here understood as comprising various mixtures of hydrocarbons used as fuel in internal combustion or high-compression engines. Thus, this term in particular encompasses fuel oil, diesel oil and all categories of petrol, as well as mixtures of hydrocarbons and alcohols, or the like. The fuel part according to the invention shows surprisingly low fuel permeability for ethanol containing fuels, also known as bio-fuels.

Fuel parts are here understood parts that can be in contact with fuel, such as fuel containers, fuel canisters, fuel caps, and fuel hoses. Fuel containers are herein understood means for containing fuel. Suitably, the container has one or more openings, suited for either separately or combined filling and/or releasing fuel.

Polyamide A

Polyamide A present in the fuel part comprising a polymer composition include all semi-crystalline polyamides presently known in which the ratio of terminal carboxy group concentration over terminal amino group concentration of the polyamide A is equal to 1 or higher. This ratio of terminal carboxy group concentration over terminal amino group concentration can be expressed as:

$$([\text{terminal carboxy groups}]/[\text{terminal amino groups}]) \geq 1 \qquad \text{form. I}$$

whereby [terminal carboxy groups] is the concentration of terminal carboxy end groups in the polymer in meq/kg, and [terminal amino groups] is the concentration of terminal amino groups in the polymer in meq/kg. Terminal amino group concentration and terminal carboxy group concentration can be measured according to the method described in the examples.

Preferably, the ratio of terminal carboxy group concentration over terminal amino group concentration of the polyamide A is higher than 1, more preferably at least 1.1 and even more preferred at least 1.2. This has the advantage that the thermal stability during melt processing is high.

"Semi-crystalline polyamide" is here understood to encompass polyamides having crystalline and amorphous regions. Suitable polyamides include aliphatic polyamides such as PA6, PA66, PA46, PA410, PA610, PA11, PA12, PA412 as well as blends thereof, but also semi-aromatic polyamides. Suitable semi-aromatic polyamides include terephthalic acid based polyamides like PA6T, PA9T, PA4T and PA6T6I, as well as PAMXD6 and PAMXDT, and copolyamides thereof, as well as blends thereof, as well as blends of aliphatic and semi-aromatic polyamides.

Preferably, polyamide A in the polymer composition is chosen from the group of PA6, PA66 or blends thereof, as this has the advantage that these polyamides are readily available and have god base fuel permeation level coupled with good level of ductility or resistance to impact.

Preferably, the polyamide in the polymer composition has a higher molecular weight or relative solution viscosity, as this results in lower fuel permeation.

Micro Talcum

Micro talcum present in the polymer composition preferably has a median diameter of less than 1 micrometer, more preferably less than 0.7 micrometer, even more preferred less than 0.6 micrometer. The particle size distribution of micro talcum is determined by a high speed image analyzer. This analyzer projects all particles in a limited sample into 2-dimensional images and measures the actual surface area of all captured separate particles. These surface area are subsequently recalculated into circles having the same surface area of which the diameter is calculated. The median value of the particle size distribution is then determined by known means. This has the advantage that the micro talcum is more effective in reducing the fuel permeation level than talcum particles with a higher median diameter.

Micro talcum may be present in the polymer composition in very low amounts, such as in an amount of at least 0.001 wt % with respect to the total amount of the polymer composition, preferably at least 0.01 wt %, more preferably at least 0.02 wt %, even more preferably at least 0.04 wt %. Preferably, micro talcum may be present in the polymer composition in an amount of at most 0.8 wt % with respect to the total amount of the polymer composition, more preferably at most 0.5 wt % and even more preferred at most 0.2 wt %.

Amounts of micro talcum according to the invention have the advantage that the cold impact at −30° C. remains sufficient.

Impact Modifier

The fuel part according to the invention comprises an impact modifier in an amount of at least 1 weight percent with respect to the total amount of the polymer composition.

Impact modifiers as such are known, and are rubber-like polymers that not only contain apolar monomers such as olefins, but also polar or reactive monomers such as, among others, acrylates and epoxide, acid or anhydride containing monomers. Examples include a copolymer of ethylene with (meth)acrylic acid or an ethylene/propylene copolymer functionalized with anhydride groups. The advantage of impact modifiers is that they do not only improve the impact strength of the polymer composition but also contribute to an increase in viscosity.

Preferably the amount of impact modifiers is at least 5 wt % with respect to the total amount of the polymer composition, more preferably at least 10 wt %. This has the advantage that the impact strength is good.

Preferably, the amount of impact modifiers is at most 60 wt % with respect to the total amount of the polymer composition, more preferably at most 50 wt %. This has the advantage that the barrier properties remain sufficient. Preferably, the impact modifier is chosen from the group of maleic anhydride functionalized polyolefin.

Polyamide B

Surprisingly, it has been shown that the further presence of a polyamide B being PA410 in an amount of at least 0.1 wt % based on the total amount of the polymer composition in a fuel part according to the invention leads to even lower fuel permeability, as compared to fuel parts not comprising PA410. PA410 is here understood to be a polyamide containing monomer units of 1,4-diaminobutane and 1,10-decanedioic acid.

Preferably, PA410 is present in the polymer composition in an amount of at least 0.2 wt % with respect to the total amount in the polymer composition. More preferably, the amount of PA410 is at least 0.5 wt %, even more preferably the amount is at least 1 wt %.

Preferably, PA410 is present in an amount of at most 10 wt %.

Preferably, the polymer composition comprises a blend of PA6 and PA410 or PA66 and PA410. This has the advantage that the relative gain in fuel permeation reduction is big and the ductility of fuel part is good.

Other Additives

The fuel part according to the invention can optionally comprise other additives such as, fillers, colorants, release agents and lubricants.

Suitable fillers are mineral fillers such as clay, mica, talc, glass spheres. Reinforcing fibres are for example glass fibres. As reinforcing fibres the polyamide composition preferably comprises 5 to 60 wt % glass fibres, relative to the total amount of the polymer composition, more preferably 10 to 45 wt %, and most preferably 15 to 40 wt % glass fibres. Suitable glass fibres generally have a diameter of 5-20 micron, preferably 8-15 micron, and are provided with a coating suitable for use in polyamide. An advantage of a polymer composition comprising glass fibres is its increased strength and stiffness, particularly also at higher temperatures, which allows use at temperatures up to close to the melting point of the polymer in a polymer composition.

As colorants for example carbon black or nigrosine can be employed.

Preferably, the amount of extractables in a fuel part is low to avoid contamination of fuel lines and filters. Preferably, the fuel part is thus dispersant-free.

Process for Producing of a Fuel Part

The invention also relates to a process for producing a fuel part according to the invention by injection-molding or blow-molding or roto-molding. Injection molding is here understood to comprise the following steps:
  a. heating a polymer composition to obtain a viscous liquid;
  b. filling a mold cavity with the viscous liquid;
  c. leaving the viscous liquid in the mold under pressure until it cools and solidifies to form a part;
  d. opening the mold;
  e. ejecting the part.

The polymer composition used in step a) is the polymer composition as described above.

Blow-molding is here understood to comprise at least the following steps:
  a. heating a polymer composition to obtain a viscous liquid;
  b. forming a parison from the viscous liquid;
  c. expand the parison by pressurized gas and press it against a mold cavity until it cools and solidifies to form a part;
  d. opening the mold;
  e. ejecting the part.

Roto-molding is here understood to comprise at least the following steps:
  a. filling a mold with a polymer composition;
  b. heating the mold while rotating it to a temperature at which the polymer composition melts;
  c. dispersing the polymer composition to the wall of the mold;
  d. sintering the polymer composition;
  e. cooling the mold until the polymer composition solidifies to form a part
  f. opening the mold;
  g. ejecting the part.

The polymer composition in step a) is the polymer composition as described above.

Preferably, the fuel part according to the invention is made by injection molding as fuel parts are obtained exhibiting low fuel permeability, while maintaining good mechanical properties such as the cold impact strength at −30° C.

The invention will now be elucidated by examples, without the wish to be limited hereto.

EXAMPLES

Fuel Permeation Rate

The fuel permeation rate (P) was measured by the weight loss method according to ASTM E96BW in which water has been replaced by ASTM fuel CE10 (composed of 10 vol. % ethanol and 90 vol. % of ASTM fuel C (50/50 wt % mixture of toluene and iso-octane)). The fuel permeation measurements were performed at 40° C. under dry conditions. The standard deviation in this method is between 5 and 10%.

Cold Impact Data

Dynatup instrumented impact was performed using the guidelines of ASTM D 3763 and ISO 6603-2. Discs (2"×⅛") were injection molded and tested −30° C. in a dry-as-molded state. The tup diameter was 0.5 inches with a lower clamp support diameter of 1.5 inches. The test speed was 6.8 ft/sec. At least five discs were tested. Discs of each material had been placed in a −30° C. freezer overnight. Test parts were transferred from the freezer to the test chamber one set at a time. The discs were tested after the chamber had equilibrated to the set temperature.

Terminal Amino Group Concentration/Terminal Carboxy Group Concentration

The carboxyl end groups were potentiometrically determined in o-cresol by means of a titration with tetrabutyl ammonium hydroxide.

The amino end groups were potentiometrically determined in phenol by means of a titration with hydrochloric acid.

All weight percentages are given with respect to the total amount of polymer composition, unless stated otherwise.

Polyamides used
PA6
Micro Talcum

Median diameter of 0.50 micrometer, 99% was less than 5 micrometer, 92% less than 2 micrometer and 75% less than 1 micrometer.

Impact Modifier

As impact modifier was used a maleic anhydride (MAH) grafted ethene copolymer.

Comparative examples are denoted with a C. Examples according to the invention are numbered I, II, III etc.

TABLE 1

Fuel permeation and cold impact data (T = 40° C.)

| Example nr: | Polyamide A [wt %] | Impact modifier [wt %] | Micro talcum content [wt %] | terminal end group ratio of polyamide A | P [gmm/m$^2$ day] | Energy @ max load @−30° C., ft-lbs | Failure mode |
|---|---|---|---|---|---|---|---|
| C_1 | PA6 90.25 | 9.75 | 0 | 1.02 | 3.8 | 17.9 | all ductile |
| I | PA6 90.25 | 9.75 | 0.05 | 1.02 | 2.4 | n.m. | n.m. |
| II | PA6 90.25 | 9.75 | 0.1 | 1.02 | 2.2 | n.m. | n.m. |
| C_2 | PA6 80 | 20 | 0 | 1.33 | 4.3 | n.m. | n.m. |
| III | PA6 80 | 20 | 0.05 | 1.33 | 4.0 | 20.4 | all ductile |
| IV | PA6 80 | 20 | 0.1 | 1.33 | 3.8 | 18.3 | all ductile |
| V | PA6 80 | 20 | 0.17 | 1.33 | 3.78 | 19.0 | 3 brittle/4 ductile | n.m. is not measured

Table 1 clearly exemplifies that a combination of polyamide A in which the ratio of terminal carboxy group concentration over terminal amino group concentration of the polyamide A is equal to 1 or higher and comprising micro talcum and impact modifier results in low fuel permeation rates, while maintaining the Energy at maximum load at −30° C. (Examples I to V), whereas the comparative examples in which micro talcum is absent had higher fuel permeability (Examples C_1 and C_2).

Also the effect of the presence of carbon black was tested. Table 2 shows the results.

TABLE 2

Effect of carbon black

| Example nr: | Polyamide A [wt %] | Impact modifier [wt %] | Micro talcum [wt %] | terminal end group ratio of polyamide A | P [gmm/m$^2$ day] | Carbon black [wt %] |
|---|---|---|---|---|---|---|
| VI | PA6 80 | 20 | 0.05 | 1.33 | 4.0 | 0 |
| VII | PA6 80 | 20 | 0.05 | 1.33 | 4.1 | 0.15 |

Table 2 clearly shows that the presence of carbon black hardly influenced the fuel permeability.

Measurements on Fuel Tanks

Permeation measurements were performed on pre-soaked, sealed blow-moulded tanks at 28° C. and atmospheric pressure, which were filled for at least 40 vol % of fuel CE10. The tanks were made from a polymer composition of 89 wt % PA6 with a ratio of terminal carboxy group concentration over terminal amino group concentration higher than 1, 9.75 wt % impact modifier and 0.08 wt % micro talcum. Various thicknesses were produced. The fuel permeation rate is presented in Table 3.

TABLE 3

| Nominal wall thickness [mm] | Permeation rate [g/m2 day] |
|---|---|
| 2 | 0.19 |
| 1.8 | 0.18 |
| 1.6 | 0.18 |

TABLE 3-continued

| Nominal wall thickness [mm] | Permeation rate [g/m2 day] |
|---|---|
| 1.4 | 0.21 |
| 1.2 | 0.5 |

The results in Table 3 clearly show that a fuel part according to the invention shows a very low permeation rate.

The invention claimed is:
1. A fuel part for contact with a hydrocarbon fuel, wherein the fuel part is formed of a polymer composition comprising:
(i.) at least 80 wt. % based on total weight of the polymer composition of at least one aliphatic polyamide selected from the group consisting of polyamide-6 (PA6), polya- mide-66 (PA66), polyamide-410 (PA410) and polyamide-46 (PA46) having a ratio of terminal carboxy group concentration over terminal amino group concentration which is equal to 1 or higher, (ii.) 0.001 wt. % to 0.8 wt. % based on total weight of the polymer composition of a micro talcum having a median diameter of less than 1 micrometer; and (iii.) 5 wt. % to 50 wt. % based on total weight of the polymer composition of an impact modifier, wherein the fuel part is selected from the group consisting of fuel containers, fuel canisters, fuel caps and fuel hoses, and wherein the fuel part exhibits a fuel permeation rate for the hydrocarbon fuel measured by a weight loss method according to ASTM E96BW using ASTM fuel CE10 which is less than a comparable fuel part formed of an identical polymer composition not containing the micro talcum.

2. The fuel part according to claim 1, wherein the micro talcum is present in an amount between 0.01 to 0.5 weight percent based on the total amount of the polymer composition.

3. The fuel part according to claim 1, wherein the micro talcum is present in an amount between 0.01 to 0.2 weight percent based on the total amount of the polymer composition.

4. The fuel part according to claim 1, wherein the ratio of terminal carboxy group concentration over terminal amino group concentration of the aliphatic polyamide is at least 1.1.

5. The fuel part according to claim 1, wherein the ratio of terminal carboxy group concentration over terminal amino group concentration of the aliphatic polyamide is at least 1.2.

6. The fuel part according to claim 1, wherein the impact modifier is a maleic anhydride functionalized polyolefin.

7. The fuel part according to claim 1, further comprising glass fibers in an amount between 5 to 60 wt % based on the total amount of polymer composition.

8. A process for producing the fuel part according to claim 1, wherein the process comprises injection molding the polymer composition to produce the fuel part.

* * * * *